(12) United States Patent
Ooi

(10) Patent No.: US 7,709,801 B2
(45) Date of Patent: May 4, 2010

(54) NUCLEAR MEDICINE DIAGNOSIS EQUIPMENT

(75) Inventor: Jyunichi Ooi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 119 days.

(21) Appl. No.: 12/088,231

(22) PCT Filed: Oct. 4, 2005

(86) PCT No.: PCT/JP2005/018360

§ 371 (c)(1),
(2), (4) Date: Mar. 26, 2008

(87) PCT Pub. No.: WO2007/043137

PCT Pub. Date: Apr. 19, 2007

(65) Prior Publication Data

US 2009/0179154 A1 Jul. 16, 2009

(51) Int. Cl.
*G01T 1/20* (2006.01)
(52) U.S. Cl. ............ 250/367; 250/361 R; 250/363.03; 250/363.04
(58) Field of Classification Search ............ 250/361 R, 250/363.03, 363.04, 367
See application file for complete search history.

(56) References Cited

U.S. PATENT DOCUMENTS 6,087,663 A 7/2000 Moisan et al.

2004/0129886 A1* 7/2004 Lecoq ............... 250/363.03

FOREIGN PATENT DOCUMENTS

| JP | 06-337289 A | 12/1994 |
|---|---|---|
| JP | 2000-056023 A | 2/2000 |
| JP | 2002-090458 A | 3/2002 |
| JP | 2002-513469 A | 5/2002 |
| JP | 2004-532997 A | 10/2004 |
| WO | WO-03/001242 A1 | 1/2003 |

OTHER PUBLICATIONS

International Search Report for the Application No. PCT/JP2005/018360 mailed Jan. 10, 2006.

* cited by examiner

*Primary Examiner*—David P Porta
*Assistant Examiner*—Mark R Gaworecki
(74) *Attorney, Agent, or Firm*—Cheng Law Group, PLLC

(57) ABSTRACT

The present invention relates to a nuclear medicine diagnosis equipment comprising a scintillator block having a plurality of scintillators, the scintillator block having a plurality of scintillator arrays in a depth direction of an incident γ ray with different decay times for an emitted light pulse; an incidence timing calculating device for calculating an incident timing in the scintillator array; a scintillator array identifying device for identifying a scintillator array, in a plurality of arrays, that has received the electrical signal; and an incidence timing compensation device in a position arithmetic processing part for discriminating whether compensation for an incidence timing calculated by the incidence timing calculating device is to be done or not corresponding to a scintillator array identified by the scintillator array identification part.

9 Claims, 7 Drawing Sheets

NUCLEAR MEDICINE DIAGNOSIS EQUIPMENT

FIELD OF THE INVENTION

The present invention relates to a nuclear medicine diagnosis equipment (ECT apparatus) for obtaining a tomogram image for a concerned region by dosing a subject with a radiopharmaceutical, and then by coincidence counting of a pair of γ rays emitted from a positron emission radioisotope (radioisotope, RI) accumulated in a region of interest of this subject, and the present invention specifically relates to a technique for coincidence counting of the γ ray.

RELATED ART

A PET (Positron Emission Tomography) apparatus will be described hereinafter as an example among the above-described nuclear medicine diagnosis equipments, i.e., ECT (Emission Computed Tomography) apparatuses. The PET apparatus has a configuration in which two γ rays that are emitted from a region of interest of a subject in two mutually reverse directions making approximately 180 degrees are detected with γ ray detectors disposed facing each other, and a tomogram image of the subject is reconstructed in simultaneous detection (coincidence counting) of these γ rays. Furthermore, some of the γ ray detectors used for coincidence counting of a γ ray in the PET apparatus have a scintillator that emits light by incidence of a γ ray emitted from a subject, and a photo multiplier tube that converts the emitted light into an electrical signal in this scintillator.

Here, in principle, a γ ray emitted from a position distant from a center of view often diagonally enters into the scintillator of the γ ray detector, and therefore the γ ray will be detected not only in the correct position, but also in an incorrect position. That is, parallax errors will gradually be larger toward a circumference part from a center of view, resulting in inaccurate tomogram image obtained with the PET apparatus. For this reason, in some examples, the scintillator is divided into a plurality of scintillators having different decay times for the emitted light pulse (in an optically combined condition) in an incident direction of the γ ray, for example, the scintillator is divided into a scintillator array having a shorter decay time for the γ ray in an incidence side of the γ ray and a scintillator array having a longer decay time for the γ ray in a photo multiplier tube side. Thereby the position of the emitted γ ray will be detected with higher precision even in the case of diagonal incidence of the γ ray to the scintillator of the γ ray detector, expecting improvement of acquisition of more accurate and precise tomogram images. (For example, refer to Patent Documents 1, 2).

[Patent Document 1]
JP-A, No. 06-337289 (pages 2 to 3, FIG. 1)
[Patent Document 2]
JP-A, No. 2000-56023 (pages 2 to 3, FIG. 1)

DESCRIPTION OF THE INVENTION

Problems To Be Solved By The Invention

However, conventional nuclear medicine diagnosis equipments have following problems. That is, scintillators having different decay times for an emitted light pulse often have different rise times for the emitted light pulse. Accordingly, a possible time lag will arise in detection between the opposing γ ray detectors in the case of coincidence counting with γ ray detectors using scintillator arrays having different rise times for an emitted light pulse. That is, actually simultaneously emitted γ rays may not be recognized, by this time lag, to be simultaneously emitted γ rays, in coincidence counting processing based on detection with the γ ray detector, leading to a possible problem of reduction of detection sensitivity. Furthermore, in order to improve reduction of the detection sensitivity, when a condition is set so that a judgment of being simultaneous may be given in case of a detection between the opposing γ ray detectors having a time lag by setting wider a time range (timing window) for recognition as an effective count in coincidence counting processing, influence of random coincidence counting, scattered coincidence counting, etc. may increase to give degradation of reconstructed images, leading to possible problems.

The present invention has been made in view of the above-described circumstances, and aims at providing a nuclear medicine diagnosis equipment allowing acquisition of an accurate and precise tomogram image having high sensitivity and providing avoidance of degradation of a reconstructed image, even in use as a γ ray detector of a scintillator having different decay times for an emitted light pulse.

Means For Solving The Problem

In order to achieve such objectives, the present invention has following configuration. A nuclear medicine diagnosis equipment of the present invention comprises:

a scintillator block having a plurality of two-dimensionally and closely arranged scintillators, the scintillator block having a plurality of optically combined scintillator arrays in a depth direction of an incident γ ray with different decay times for an emitted light pulse;

a photodetector for converting an emitted light pulse emitted in the scintillator block into an electrical signal;

an incidence timing calculating device for calculating an incident timing in the scintillator array for the electrical signal outputted from the photodetector;

a scintillator array identifying device for identifying a scintillator array, in a plurality of arrays, that has received the electrical signal outputted from the photodetector; and an incidence timing compensation device for discriminating whether compensation for an incidence timing calculated by the incidence timing calculating device is to be done or not corresponding to a scintillator array identified by the scintillator array identification device, and for compensating the incidence timing based on a result of discrimination.

Effectiveness of the present invention according to claim 1 will be described hereinafter. First, a γ ray emitted from a subject enters into a scintillator block having a two-dimensionally and closely arranged plurality of scintillators and having a plurality of optically combined scintillator arrays in a depth direction of an incident γ ray with different decay times for an emitted light pulse. Furthermore, the γ ray that has entered into the scintillator block emits light in each scintillator having different decay time for the emitted light pulse in the scintillator array. Subsequently, the emitted light pulse that has been emitted in each scintillator is converted into an electrical signal by a photodetector. In the next stage, an incidence timing calculating device calculates a timing of incidence to the scintillator array for the electrical signal outputted from the photodetector. Furthermore, a scintillator array identifying device identifies a scintillator array that has received the electrical signal outputted from the photodetector, in a plurality of the scintillator arrays. An incidence timing compensation device discriminates whether compensation for the incidence timing calculated by the incidence timing calculating device is to be done or not corresponding to the scintillator array identified by the scintillator array identification device, and compensates the incidence timing based on a result of discrimination. Accordingly, since the incidence timing compensation device discriminates whether compensation for the incidence timing calculated by the incidence timing calculating device is to be done or not corresponding to the scintillator array identified by the scintillator array identifying device, and also compensates the incidence timing based on a result of discrimination, a time lag of detection between the scintillator arrays caused by difference of decay time of the emitted light pulse can be canceled by compensation even in case of coincidence counting by use of a scintillator having different decay time to the emitted light pulse. Accordingly, a precise and accurate tomogram image accompanied by improvement in detection sensitivity and by avoidance of degradation of reconstructed image may be obtained.

Furthermore, the nuclear medicine diagnosis equipment according to claim 2 of the present invention has an A/D converter for converting an analog signal in a form of an electrical signal outputted from a photodetector into a digital signal, the scintillator array identifying device comprising:

an adding device for sequentially adding digital signals converted by the A/D converter;

an identified value calculating device for calculating an identified value giving a value obtained by division of an intermediate added value by a total added value, by using an intermediate added value obtained, in the adding device, by addition of the digital signals from a point of time of emission start of the emitted light pulse that has been emitted in the scintillator block to a certain middle point of time in the course of a point of time of emission end, and a total added value obtained, in the adding device, by addition of a digital signal from a point of time of emission start to a point of time of emission end of the emitted light pulse that has been emitted in the scintillator block in the adding device; and a discriminating device for discriminating whether the identified value calculated by the identified value calculating device is a larger value or a smaller value as compared with an intermediate value between the identified values of each scintillator array calculated by the identified value calculating device.

According to the nuclear medicine diagnosis equipment of claim 2 of the present invention, the A/D converter converts an analog signal in a form of an electrical signal outputted from the photodetector into a digital signal. Next, the adding device of the scintillator array identifying device sequentially adds the digital signals converted by the A/D converter. Here, the identified value calculating device calculates the identified value giving a value obtained by division of an intermediate added value by a total added value, by using the intermediate added value obtained, in the adding device, by addition of the digital signals from a point of time of emission start to a certain intermediate point of time that is an intermediate point of time from the point of time of the emission start to a point of time of the emission end of the emitted light pulse in the scintillator block, and the total added value obtained, in the adding device, by addition of a digital signal from a point of time of emission start to a point of time of emission end of the emitted light pulse that has been emitted light in the scintillator block in the adding device. Furthermore, an intermediate value calculating device determines an intermediate value between the identified values of each scintillator array calculated by the identified value calculating device, and the discriminating device discriminates whether the identified value calculated by the identified value calculating device is a large value or a small value as compared with the intermediate value calculated by the intermediate value calculating device.

Accordingly, discrimination of whether the identified value calculated by the identified value calculating device is a larger value or a smaller value may be done based on the sequential addition by the adding device of the scintillator array identifying device. That is, the scintillator array identifying device can identify which scintillator array in the scintillator has emitted the emitted light pulse. Furthermore, this equipment allows replacement of an integral action conventionally performed by an integrator into an adding action of a sequential addition in the adding device, leading to reduction of the number of parts, and cost reduction.

The nuclear medicine diagnosis equipment according to claim 3 of the present invention comprises:

a coincidence counting device for performing coincidence counting using an incidence timing compensated by the incidence timing compensation device and an incidence timing discriminated as not compensated by the incidence timing compensation device; and a timing window storing device for storing a timing window showing a predetermined range for performing coincidence counting by the coincidence counting device as a timing window corresponding to a combination of each of the plurality of scintillator arrays.

According to the nuclear medicine diagnosis equipment of claim 3 of the present invention, the coincidence counting device performs coincidence counting using an incidence timing compensated by the incidence timing compensation device and an incidence timing discriminated as not compensated by the incidence timing compensation device. Here, the coincidence counting is performed using a timing window showing a predetermined range that has been judged as the coincidence counting being coincident, and the coincidence counting is performed using a timing window corresponding to a combination of each of the plurality of scintillator arrays stored by the timing window storing device. Accordingly, use of a different timing window corresponding to the combination of each of the plurality of scintillator arrays allows a high-precision coincidence counting and reduction of influence of random coincidence counting and scattered coincidence counting, etc., leading to high definition image with less noises.

Furthermore, the nuclear medicine diagnosis equipment according to claim 4 of the present invention comprises:

a coincidence counting device for performing coincidence counting using an incidence timing compensated by the incidence timing compensation device and an incidence timing discriminated as not compensated by the incidence timing compensation device; and a timing window storing device for storing a timing window showing a predetermined range for performing coincidence counting by the coincidence counting device as a timing window corresponding to a combination of each of the plurality of scintillators.

According to the nuclear medicine diagnosis equipment of claim 4 of the present invention, the coincidence counting device performs coincidence counting using an incidence timing compensated by the incidence timing compensation device and an incidence timing discriminated as not compensated by the incidence timing compensation device. Here, the coincidence counting is performed using a timing window showing a predetermined range that has been judged as the coincidence counting being coincident, and the coincidence counting is performed using a timing window corresponding to a combination of each of the plurality of scintillators stored by the timing window storing device. Accordingly, use of a different timing window corresponding to the combination of each of the plurality of scintillators allows a high-precision coincidence counting and reduction of influence of random coincidence counting and scattered coincidence counting, etc., leading to high definition image with less noises.

The nuclear medicine diagnosis equipment according to claim 5 of the present invention comprises a light guide for optically coupling the scintillator block and the photodetector.

According to the nuclear medicine diagnosis equipment of claim 5 of the present invention, the nuclear medicine diagnosis equipment comprises the light guide for optically coupling the scintillator block and the photodetector. Accordingly, the light guide can suitably guide a light from the scintillator block to the photodetector.

Furthermore in the nuclear medicine diagnosis equipment according to claim 6 of the present invention, the a plurality of scintillator arrays is constituted by either one of scintillators of $Gd_2SiO_5$ (GSO) having Ce concentration of 0.5 mol, $Gd_2SiO_5$ (GSO) having Ce concentration of 1.5 mol, $Lu_2SiO_5$ (LSO), $Lu_xGd_{2-x}SiO_5$ (LGSO), $Lu_xY_{2-x}SiO_5$ (LYSO), $Bi_4Ge_3O_{12}$ (BGO), NaI, $BaF_2$, and CsF.

According to the nuclear medicine diagnosis equipment of claim 6 of the present invention, the a plurality of scintillator arrays is constituted by $Gd_2SiO_5$ (GSO) having Ce concentration of 0.5 mol, $Gd_2SiO_5$ (GSO) having Ce concentration of 1.5 mol, $Lu_2SiO_5$ (LSO), $Lu_xGd_{2-x}SiO_5$ (LGSO) $Lu_xY_{2-x}SiO_5$ (LYSO), $Bi_4Ge_3O_{12}$ (BGO), NaI, $BaF_2$, and CsF. Accordingly, various scintillators for constituting the plurality of scintillator arrays may be selected, and thereby not only expensive scintillators but inexpensive scintillators may be used, leading to reduction of costs.

Furthermore, in the nuclear medicine diagnosis equipment according to claim 7 of the present invention, the photodetector is made of a photo multiplier tube.

According to the nuclear medicine diagnosis equipment of claim 7 of the present invention, since the photodetector is a photo multiplier tube, it can appropriately convert a light from the scintillator block into an electrical signal.

Moreover, in the nuclear medicine diagnosis equipment according to claim 8 of the present invention, the photodetector is made of a photo-diode.

According to the nuclear medicine diagnosis equipment of claim 8 of the present invention, since the photodetector is a photo-diode, it can appropriately convert a light from the scintillator block into an electrical signal.

Moreover, in the nuclear medicine diagnosis equipment according to claim 9 of the present invention, the photodetector is an avalanche photodiode.

According to the nuclear medicine diagnosis equipment of claim 9 of the present invention, since the photodetector is an avalanche photodiode, it can appropriately convert a light from the scintillator block into an electrical signal.

Effect of the Invention

According to the nuclear medicine diagnosis equipment according to the present invention, the incidence timing compensation device discriminates whether the incidence timing calculated by the incidence timing calculating device is to be compensated or not corresponding to the scintillator array identified by the scintillator array identifying device, and compensates the incidence timing based on the result of the discrimination. Therefore, the difference of the time of detection between the scintillator arrays caused by the difference of decay time of the emitted light pulse may be canceled by compensation even in case of coincidence counting using the scintillators having different decay time for the emitted light pulse. Accordingly, a precise and accurate tomogram image providing a higher detection sensitivity and avoidance of degradation of a reconstructed image may be obtained.

DESCRIPTION OF NOTATIONS 3a, 3b: A/D converter
4a, 4b: Incidence timing calculation part (incidence timing calculating device)
6: Coincidence counting processing part (Coincidence counting device)
15: Scintillator block
16: Light guide
17: Photo multiplier tube (photodetector)
18a, 18b: Scintillator array
19a, 19b: Scintillator
24: Scintillator array Identifying part (Scintillator array identifying device)
25: Adding part (Adding device)
26: Identified value calculating part (Identified value calculating device)
28: Discriminating part (Discriminating device)
29: Incidence timing compensation part (Incidence timing compensation device)
32: Timing window storing part (Timing window storing device)
Tw: Timing window

BEST MODE FOR CARRYING OUT OF THE INVENTION

There has been realized an objective for obtaining a precise and accurate tomogram image providing a higher detection sensitivity and avoidance of degradation of a reconstructed image even in use of a scintillator having different decay time for an emitted light pulse in a γ ray detector.

Embodiment

Figure 1:
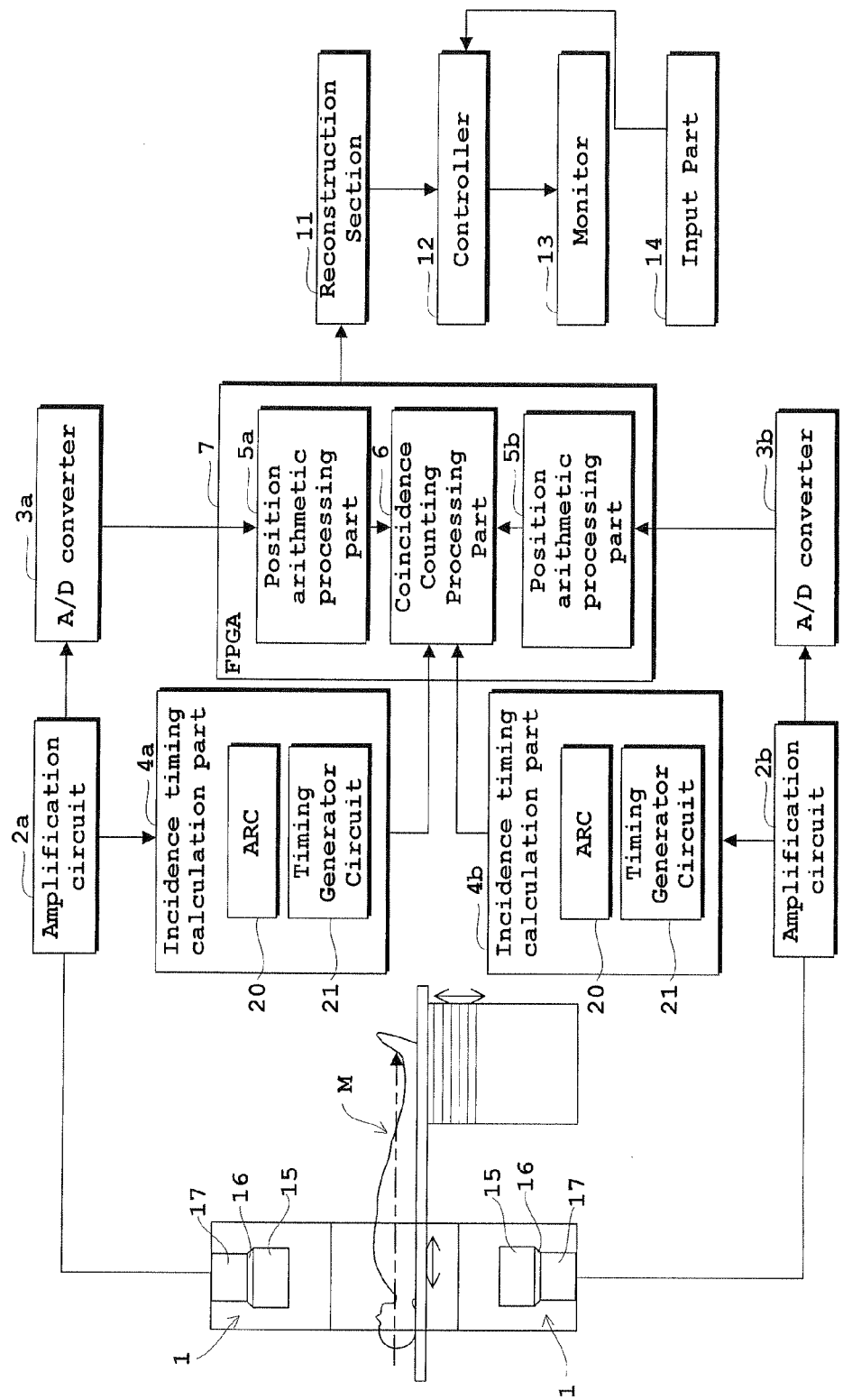
FIG. 1 is a block diagram illustrating an entire configuration of a PET apparatus.
Figure 2:
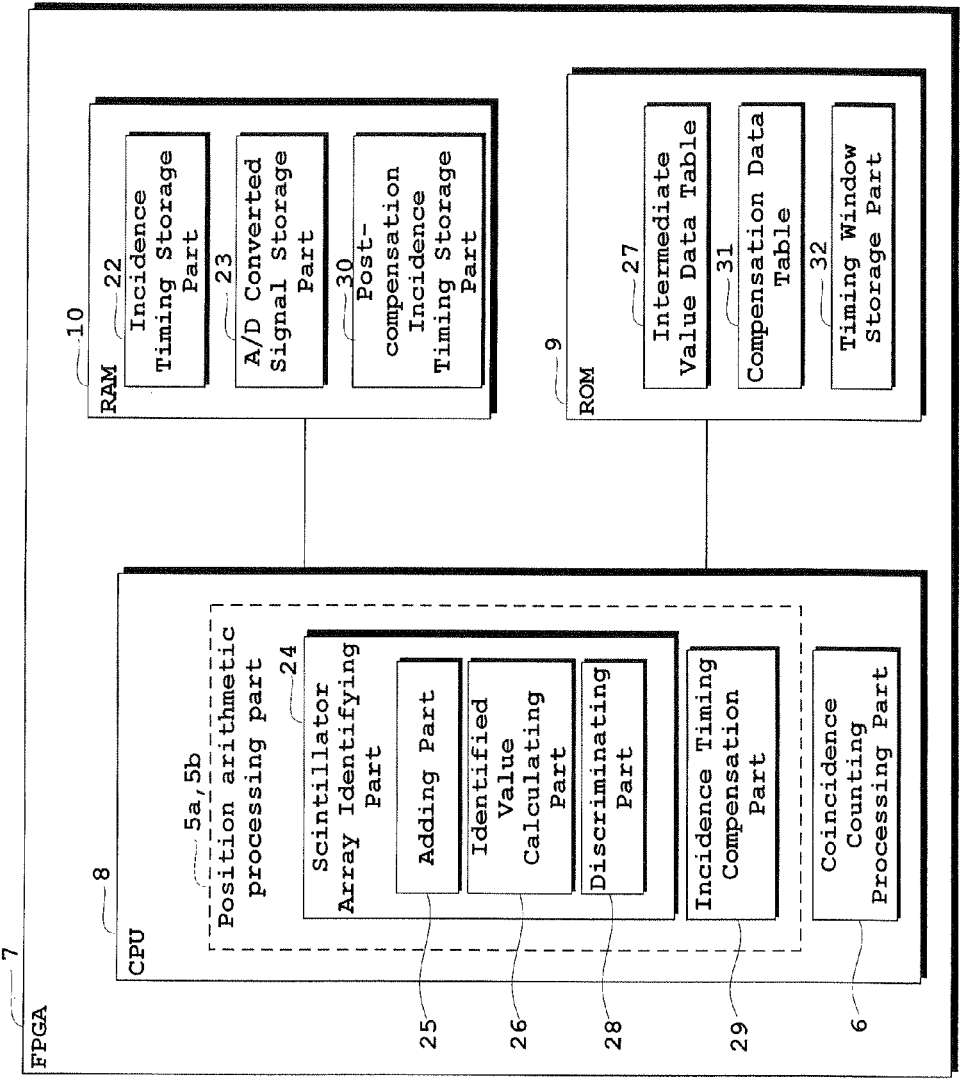
FIG. 2 is a block diagram illustrating a configuration of FPGA.

A PET (Positron Emission Tomography) apparatus will be described in detail, with reference to drawings. FIG. 1 is a block diagram illustrating a whole configuration of the PET apparatus. FIG. 2 is a block diagram illustrating a configuration of FPGA7. In this embodiment, a PET apparatus is adopted as an example for a nuclear medicine diagnosis equipment, and description will be given.

The configuration of the whole PET apparatus will be described with reference to FIG. 1. As illustrated in FIG. 1, the PET apparatus comprises γ ray detectors 1 for outputting an electrical signal after conversion of a light emitted by a positron emission radioisotope (radioisotope, RI) that has been given to a subject M in a form of radiopharmaceuticals and has been accumulated in a region of interest of this subject M. Each of the γ ray detectors 1 is disposed without any clearance in a circumference of a body axis of the subject M, for example, in a shape of a ring having a size about 700 mm in diameter (only two γ ray detectors 1 are illustrated in FIG. 1). Accordingly, two γ rays emitted in opposite directions making approximately 180 degrees from the region of interest of the subject are detected by the γ ray detectors 1 facing each other to be outputted after converted into electrical signals.

Furthermore, the PET apparatus comprises: amplification circuits 2a and 2b for amplifying electrical signals outputted from the γ ray detectors 1; A/D converters 3a and 3b for converting analog signals amplified in these amplification circuits 2a and 2b into digital signals; incidence timing calculation parts 4a and 4b for receiving the electrical signals amplified in the amplification circuits 2a and 2b and for calculating incidence timings of the γ rays detected with the γ ray detectors 1; a position arithmetic processing part 5 for calculating a position of the γ ray detector 1 that has received the γ ray emitted from the subject M based on the digital signals converted by these A/D converters 3a and 3b; and a coincidence counting processing part 6 for performing processing for detection of coincident incidence of the γ ray (coincidence counting) in these two γ ray detectors 1 based on information from the position arithmetic processing part 5 and the incidence timing calculation parts 4a and 4b. Here, as illustrated in FIG. 2, the position arithmetic processing part 5 and the coincidence counting processing part 6 are included in one programmable LSI (large scale integration circuit) called an FPGA (Field Programmable Gate Array)7. In addition, the FPGA7 has functions, such as CPU 8, ROM 9, and RAM 10, and the position arithmetic processing part 5 and the coincidence counting processing part 6 are one of functions of the CPU 8 in the FPGA 7. Furthermore, as illustrated in FIG. 1, the FPGA 7 has a reconstruction part 11 for reconstructing a tomogram image of the subject when it is discriminated that a γ ray has been coincidently detected (coincidence counting) in the coincidence counting processing part 6.

In addition, the apparatus of this embodiment is provided with a controller 12, a monitor 13, an input part 14, etc. Hereinafter, the configuration of each part of the apparatus of this embodiment will specifically be described.

The configuration of the γ ray detector 1 will be described using FIG. 3.

Figure 3:
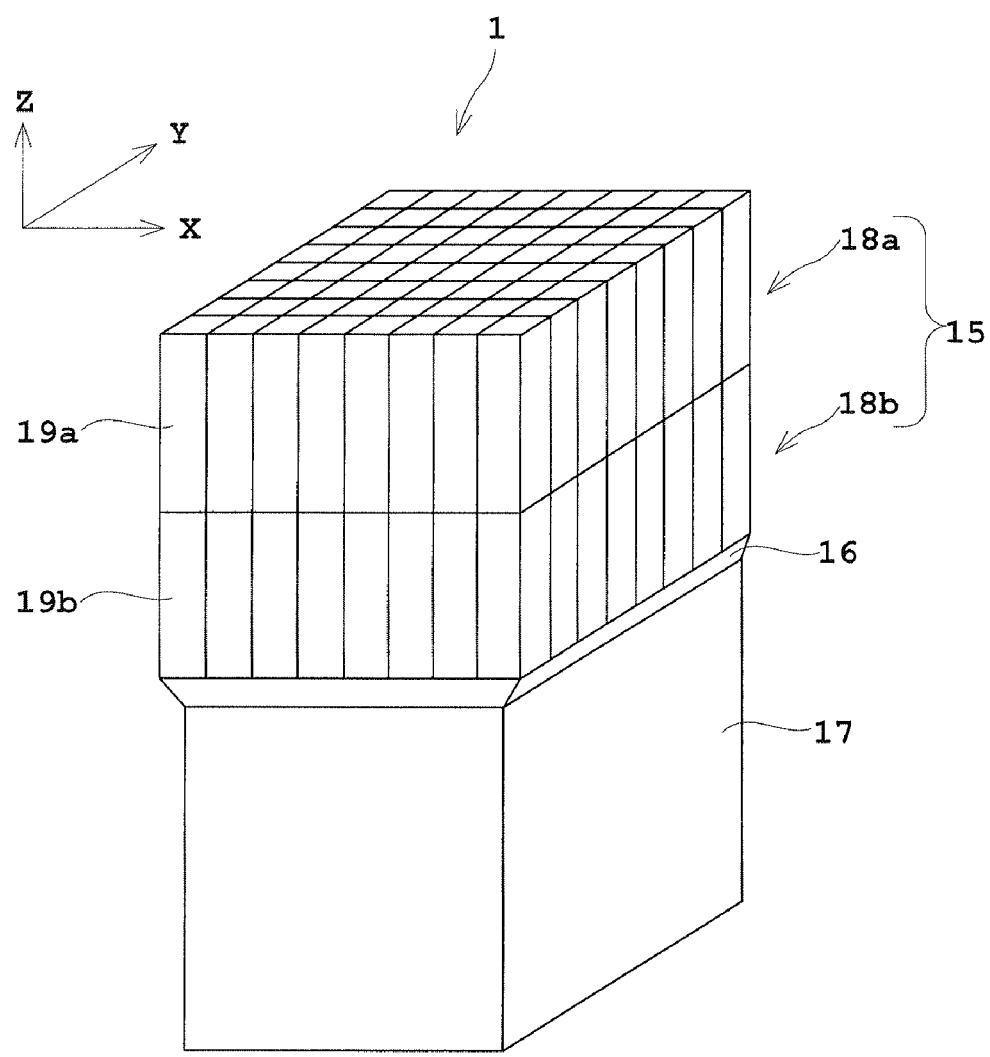
FIG. 3 is a perspective view illustrating a configuration of γ ray detector.

FIG. 3 is a perspective view illustrating a configuration of the γ ray detector 1. As illustrated in FIG. 3, the γ ray detector 1 has the scintillator 19 divided and disposed also in a depth direction of the γ ray incidence, that is, the γ ray detector 1 is a DOI (Depth Of Interaction) detector having scintillators disposed in three dimensions. For example, this DOI detector is configured with a scintillator block 15, a light guide 16, and a photo multiplier tube (PMT) 17.

In the scintillator block 15, two scintillator array 18a and scintillator array 18b having different decay time for an emitted light pulse in a depth direction (a direction Z) of an incident γ ray are optically coupled. The scintillator array 18a has a plurality of scintillators 19a, and the scintillator array 18b has a scintillator 19b in a closely contact arrangement in two dimensions, respectively. In detail, in the scintillator block 15, the scintillator array 18a using the scintillator 19a (for example, $Lu_xY_{2-x}SiO_5$ (LYSO)) having a shorter decay time for an emitted light pulse in an incidence side of the γ ray (front step), and the scintillator array 18b using the scintillator 19b (for example, $Gd_2SiO_5$ (GSO) having Ce concentration of 0.5 mol) having a longer decay time for the emitted light pulse in a light guide 16 side (back step) are stacked in two steps (two pieces). In these scintillators 19a and 19b, light is emitted in response to a γ ray emitted from the subject M. At this point, since the scintillators 19a and 19b have decay times different from each other for the emitted light pulse, they have different rise times. A longer decay time will give a later rise time, resulting in difference between the detection time of the scintillator 19a and that of the scintillator 19b. Here, the two scintillator array 18a and 18b are formed, respectively, with the scintillators 19a, 19b in a shape of 8×8 chips (direction of X, direction of Y). Furthermore, light reflecting materials and optical transmitting materials, and optical adhesives for proportional distribution of light generated by incidence of a γ ray in a direction of X and a direction of Y are inserted or charged between the scintillators 19a adjacent each other within the scintillator arrays 18a and 18b and between the scintillators 19b according to the position thereof.

The light guide 16 guides a light generated in the scintillators 19a and 19b of the scintillator block 15 to the photo multiplier tube 17. The light guide 16 is inserted between the scintillator block 15 and the photo multiplier tube 17, and is optically coupled with each other using the optical adhesive, respectively.

The photo multiplier tube 17, for example, has 4 (channel) photoelectric conversion plates built therein. A light generated in the scintillators 19a and 19b enters into four PMT photoelectric conversion plates, is electronically amplified, and then finally is converted into an electrical signal (analog signal) to be outputted. Accordingly, an output of this photo multiplier tube 17 forms an output of the γ ray detector 1. The above-described photo multiplier tube 17 is equivalent to a photodetector.

Figure 4:
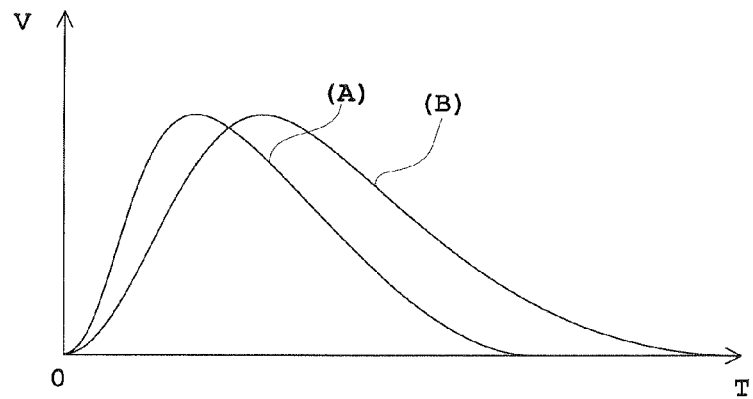
FIG. 4 is a graph illustrating a emitted light pulse of each scintillator array outputted from an amplification circuit.
Figure 5:
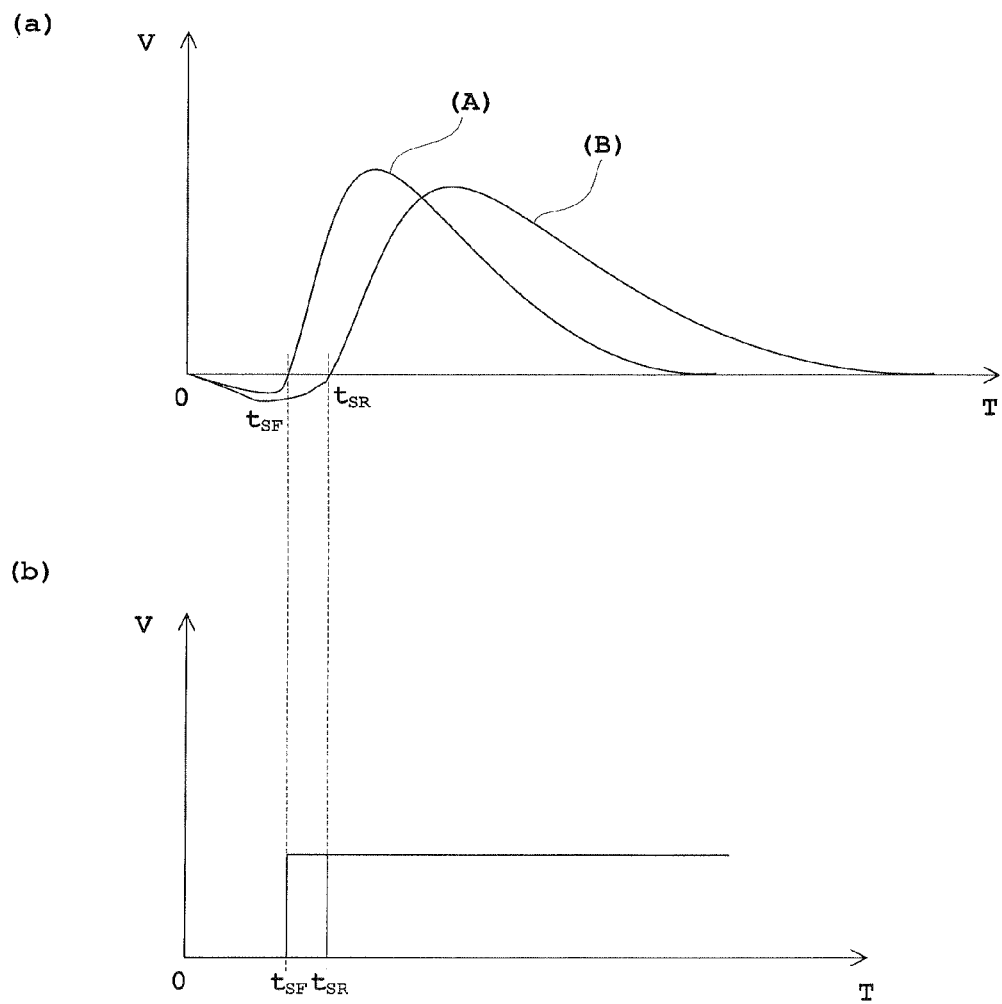
In FIGS. 5, (a) and (b) are views illustrating a timing of a γ ray that enters into each scintillator array.

An incidence timing calculation parts 4a and 4b will be described with reference to FIG. 1, FIG. 4 to FIG. 5(b). FIG. 4 is a graph illustrating an emitted light pulse of the scintillator arrays 18a and 18b outputted from the amplification circuit 2a or amplification circuit 2b. FIG. 5(a) and FIG. 5(b) are figures illustrating timings of a γ ray that entered into the scintillator arrays 18a and 18b. Here, curves of (A) in FIG. 4 and FIG. 5(a) illustrate curves of the γ ray that has entered into the scintillator array 18a with a shorter decay time for the emitted light pulse, and curves of (B) illustrate a curve of the γ ray that has entered into the scintillator array 18b with a longer decay time for the emitted light pulse.

As illustrated in FIG. 1, an electrical signal outputted from the γ ray detector 1 is inputted into the incidence timing calculation parts 4a and 4b through the amplification circuits 2a and 2b. The incidence timing of the γ ray that has entered into the scintillator arrays 18a and 18b of the γ ray detector 1 is calculated based on this electrical signal. In detail, the incidence timing calculation parts 4a and 4b have what is called a wave height and rise time compensation circuit, that is, an ARC (Amplitude and Rise-time Compensation) 20, and a timing generator circuit 21.

Analog signals, with different decay times for the emitted light pulse, that have been outputted from the amplification circuits 2a and 2b, for example, as illustrated in FIG. 4, are inputted into the ARC20 based on the γ ray that has entered into the scintillator arrays 18a and 18b of the γ ray detector 1. Furthermore, the ARC20 performs waveform shaping processing for each of these analog signals in order to calculate the incidence timing of the γ rays that have entered into the scintillator arrays 18a and 18b. In detail, this waveform shaping processing may be performed by an addition operation of values obtained by delay processing of signals obtained from the amplification circuits 2a and 2b and values obtained by a reversal processing and reduction processing of values of voltage of signals obtained from the amplification circuits 2a and 2b. Thus, the waveform is shaped into a voltage waveform as illustrated in FIG. 5(*a*). Here, $t_{SF}$, $t_{SR}$ that are points of time (zero cross point) giving a voltage of 0 will give the incidence timings of the γ rays that have entered into the scintillator arrays 18a and 18b. Furthermore, the timing generator circuit 21 converts the signal illustrating the incidence timing calculated by the ARC20, as illustrated in FIG. 5(*b*), into a digital signal, and the signal is temporarily stored in an incidence timing storage part 22 that is one function of a RAM10 of the FPGA7. Here, the above-described incidence timing calculation parts 4a and 4b are equivalent to the incidence timing calculating device.

The position arithmetic processing part 5 will be described with reference to FIG. 1. As illustrated in FIG. 1, electrical signals outputted from the γ ray detector 1 are inputted through the amplification circuits 2a and 2b and furthermore, digital signals converted by the A/D converters 3a and 3b from the analog signals inputted from these amplification circuits 2a and 2b for constantly performing A/D conversion are temporarily stored in an A/D converted signal storage part 23 that is one function of the RAM10 of the FPGA7. The position arithmetic processing parts 5a and 5b perform operation processing for determining the positions of the scintillators 19a and 19b of the γ ray detector 1 that have received the γ rays emitted from the subject M based on the digital signals stored in this A/D converted signal storage part 23. Here, the operation of the position is performed using values of voltage based on distribution of light to four input PMTs located in the back step of the scintillators 19a and 19b of the γ ray detector 1 in an X direction and a Y direction (within the same scintillators 18a and 18b) of the scintillators 19a and 19b of the γ ray detector 1 (Anger logic).

Furthermore, as illustrated in FIG. 2, the position arithmetic processing parts 5a and 5b have a scintillator array identification part 24 for identifying which scintillator arrays 18a and 18b of the two scintillators have detected the incident γ rays with the γ ray detector 1. In other words, identification of this scintillator array 18a or scintillator array 18b will perform an operation of position for the Z direction giving information of which of the scintillator 19a or the scintillator 19b of the γ ray detector 1 has received the γ ray.

Figure 6:
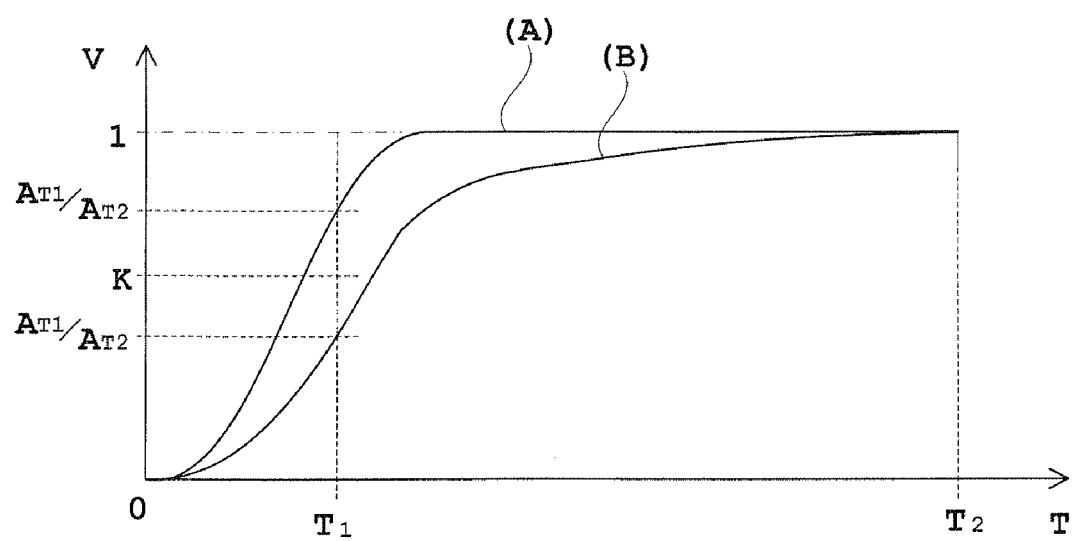
FIG. 6 is a graph illustrating added values from a point of time of emission start of an emitted light pulse to a point of time of emission end.

The scintillator array identifying part 24 will be described with reference to FIG. 6. FIG. 6 is a graph illustrating an added value from a point of time of emission start to a point of time of emission end T2 of the emitted light pulse. A curve of (A) in FIG. 6 illustrates a curve of a γ ray that has entered into the scintillator 19a (the scintillator array 18a) with a shorter decay time for the emitted light pulse, and a curve of (B) illustrates a curve of the γ ray that has entered into the scintillator 19b (the scintillator array 18b) with a longer decay time for the emitted light pulse. The scintillator array identifying part 24 comprises:

an adding part 25 for adding sequentially digital signals converted by A/D converters 3a and 3b; an identified value calculating part 26 for calculating an identified value giving (intermediate added value $A_{T1}$)/(total added value $A_{T2}$), (division of intermediate added value $AT_1$ by total added value $A_{T2}$), using an intermediate added value $A_{T1}$ obtained, in the adding part 25, by addition of the digital signals from a point of time of emission start to a certain intermediate point of time $T_1$, $T_1$ being an intermediate point of time from the point of time of the emission start to a point of time of the emission end $T_2$ of the emitted light pulse in the scintillator block 19a and 19b, and a total added value $A_{T2}$ obtained by addition of the digital signals from a point of time of emission start to a point of time of emission end of the emitted light pulse that has been emitted in the scintillator block 19a and 19b; and a discriminating part 28 for discriminating, based on emitted light pulses that have been emitted in two scintillators 19a and 19b, whether the identified value calculated by identified value calculating part 26 is a larger value or a smaller value as compared to an intermediate value K between identified values from each scintillator array calculated by the identified value calculating part 26.

Accordingly, the scintillator array identifying part 24 can identify which scintillator array of the two scintillators 18a and 18b has detected the incident γ ray with the γ ray detector 1 based on a discriminated result in the discriminating part 28. When the result of calculated $A_{T1}/A_{T2}$ is larger than the intermediate value K, the scintillator 19a with a shorter decay time will be identified, and conversely, when it is smaller, the scintillator 19b with a longer decay time will be identified. The intermediate value K is an intermediate value between both peak values (values of voltage) wherein $A_{T1}$, that is a value at most distant point of time Fs×m in waveforms of two patterns, is set in the addition process in the adding part 25 (Fs×m: Fs is a sampling interval of A/D conversion and m is a number of times of addition). The intermediate value K is beforehand acquired by experiments as data for discrimination, and is stored as an intermediate value data table 27, which is one function of the ROM9 of the FPGA7. The above-described scintillator array identifying part 24 is equivalent to the scintillator array identifying device. The above-described adding part 25 is equivalent to the adding device. The above-described the identified value calculating part 26 is equivalent to the identified value calculating device. The above-described discriminating part 28 is equivalent to the discriminating device, and an intermediate value stored by the intermediate value data table 27 is read out at the time of discrimination processing.

The position arithmetic processing parts 5a and 5b have an incidence timing compensation part 29 for discriminating whether the incidence timings calculated by the incidence timing calculation parts 4a and 4b are to be compensated, corresponding to the scintillator arrays 18a and 18b identified by the scintillator array identifying part 24, and for subsequently compensating the incidence timings based on the results of discrimination. In detail, when one scintillator of the scintillator array identified by the scintillator array identifying part 24 is identified as the scintillator 19b with a longer decay time, an operation processing for setting an incidence timing $t_{SR}$ calculated by the incidence timing calculation parts 4a and 4b as $t_{SR}-\Delta t$ (incidence timing compensated value) is performed. Subsequently, the result is outputted to post-compensation incidence timing storage part 30 that is one function of the RAM10 of the FPGA7. Conversely, when one scintillator of the scintillator array identified by the scintillator array identifying part 24 is identified as the scintillator 19a with a shorter decay time, no compensation to an incidence timing $t_{SF}$ is given. Then, the original incidence timing $t_{SF}$ without compensation inputted into the scintillator array identifying part 24 is outputted to the post-compensation incidence timing storage part 30. Furthermore, the post-compensation incidence timing storage part 30 temporarily stores the incidence timing $t_{SF}$ and the incidence timing $t_{SR}$ after compensation of difference of detection time based on a difference between decay times of scintillator array 18a and of scintillator array 18b, in a relationship between an incidence timing $t_{SF}$ and an incidence timing $t_{SR}$. The above-described incidence timing compensation part 29 is equivalent to the incidence timing compensation device.

In addition, this Δt (incidence timing compensated value) is beforehand acquired by experiments as data for compensation, and a difference of time of rise times between the scintillator array 18a and the scintillator array 18b is stored as an incidence timing compensated value in a compensation data table 31 that is one function of the ROM9 of the FPGA7. Here, an incidence timing compensated value stored in the compensation data table 31 in compensation processing is read out in the incidence timing compensation part 29.

The coincidence counting processing part 6 reads incidence timings $t_{SF}$ and $t_{SR}$ that have been stored in the post-compensation incidence timing storage part 30 every predetermined period of time (for example, 128 ns), and performs coincidence counting of incidence timings $t_{SF}$ and $t_{SR}$, in this case, 4 combinations, from the 2 γ ray detectors 1. When the difference of time calculated by these 4 combinations is within a timing window Tw (for example, 6 ns) that is a predetermined time range, the coincidence counting processing part 6 discriminates the coincidence count as a valid coincidence count, and when not, it discriminates the coincidence count as an invalid count.

Figure 7:
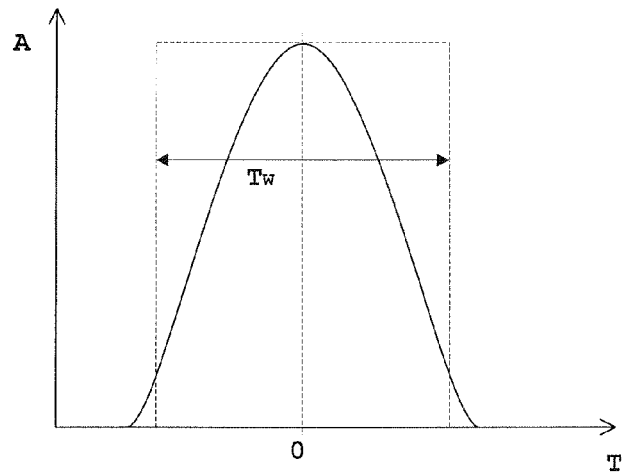
FIG. 7 is a graph for description of a timing window.

Incidentally, the timing window Tw will be described using FIG. 7, in case of coincidence counting processing of a γ ray that enters into each γ ray detector 1 having one layer (piece) of scintillator array. FIG. 7 is a graph for describing the timing window Tw. An ordinate axis A gives a number of times of an event (γ ray detection by coincidence counting processing), and an abscissa axis T gives a difference of time of detection of a γ ray by coincidence counting processing. In this way, a timing spectrum as illustrated in FIG. 7 is obtained. In this timing spectrum, a case where the abscissa axis T is 0 (detection of γ ray does not have difference of time) gives many number of times of events, and the larger difference of time, the smaller number of times of events. That is, when the abscissa axis T gives 0, this spectrum illustrates a graph similar to a Gaussian distribution that the number of times of events of the ordinate axis A gives a peak. Here, an intermediate value (A/2) of the ordinate axis A in the timing spectrum illustrated in FIG. 7 is defined as a half breadth, and then a time range of this doubled half breadth gives a timing window Tw.

Figure 8:
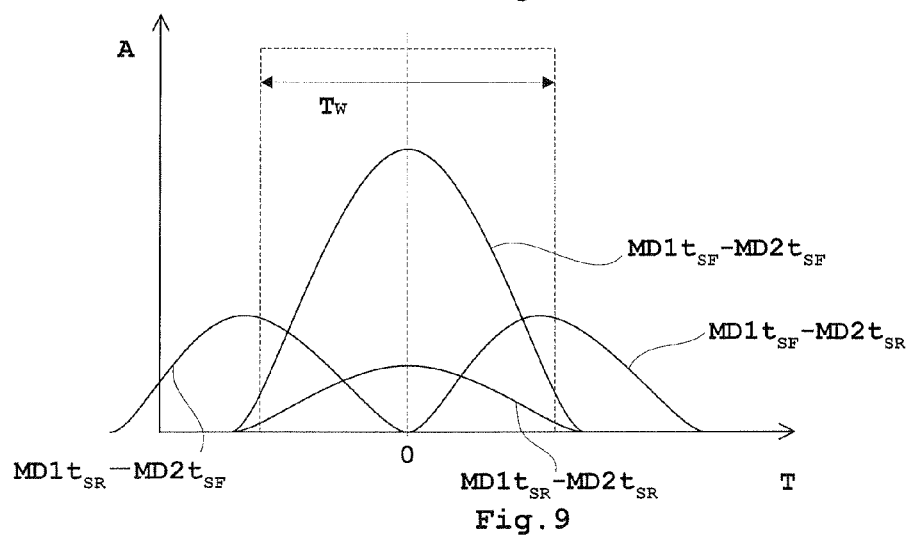
FIG. 8 illustrates a graph giving a timing spectrum without compensation of difference of detection time based on a different decay time of a scintillator array.
Figure 9:
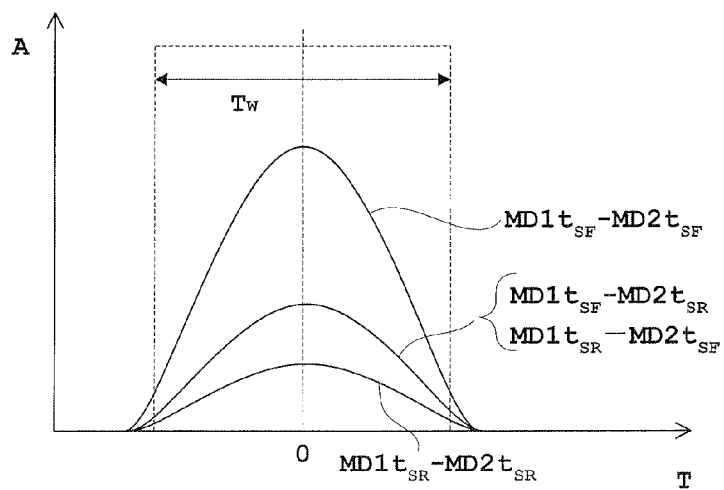
FIG. 9 illustrates a graph giving a timing spectrum with compensation of difference of detection time based on a different decay time of a scintillator array.

Here, a coincidence counting processing in the coincidence counting processing part 6 will be described using FIG. 8 and FIG. 9 in detail. FIG. 8 shows a graph that illustrates a timing spectrum in the case where the difference of detection time based on the difference between decay times of scintillator arrays is not compensated. FIG. 9 shows a graph that illustrates a timing spectrum in the case where the difference of detection time based on the difference between decay times of scintillator arrays is compensated.

First, in conventional coincidence counting processing, the difference of the detection time based on the difference of the decay times between the scintillator array 18a the and scintillator array 18b is not compensated as illustrated in FIG. 8. Four kinds of coincidence counting performed in the coincidence counting processing part 6 have 4 kinds of combinations of: $MD1t_{SF}$ and $MD2t_{SF}$; $MD1t_{SF}$ and $MD2t_{SR}$; $MD1t_{SR}$ and $MD2t_{SF}$; and $MD1t_{SR}$ and $MD2t_{SR}$, for example, when one γ ray detector 1 of two γ ray detectors 1 is defined as MD1 and another γ ray detector 1 as MD2. Since $MD1t_{SF}$ and $MD2t_{SF}$, and $MD1t_{SR}$ and $MD2t_{SR}$ do not have difference in decay times of scintillator arrays in the 4 kinds of combinations, no difference of time will be given, leading to satisfactory coincidence counting. However, $MD1t_{SR}$ and $MD2t_{SF}$, and $MD1t_{SR}$ and $MD2t_{SR}$ have difference of time based on the difference of decay times between the scintillator array 18a and the scintillator array 18b, and then a case may occur where the count is not discriminated as an effective coincidence counting count, leading to possible drop of sensitivity.

Alternatively, in case of this embodiment, since the difference of detection time based on the difference in decay times between the scintillator array 18a and the scintillator array 18b is compensated by the incidence timing compensation part 29, 4 kinds of coincidence countings performed in the coincidence counting processing part 6 will be within the timing window Tw as illustrated in FIG. 9, and therefore a counting loss of effective coincidence counting will not be generated, leading to avoidance of drop of sensitivity. Here, this timing window Tw is stored in the timing window storage part 32 that is one function of the ROM9 of the FPGA7. The above-described coincidence counting processing part 6 is equivalent to the coincidence counting device. The above-described timing window storage part 32 is equivalent to the timing window storing device.

Figure 10:
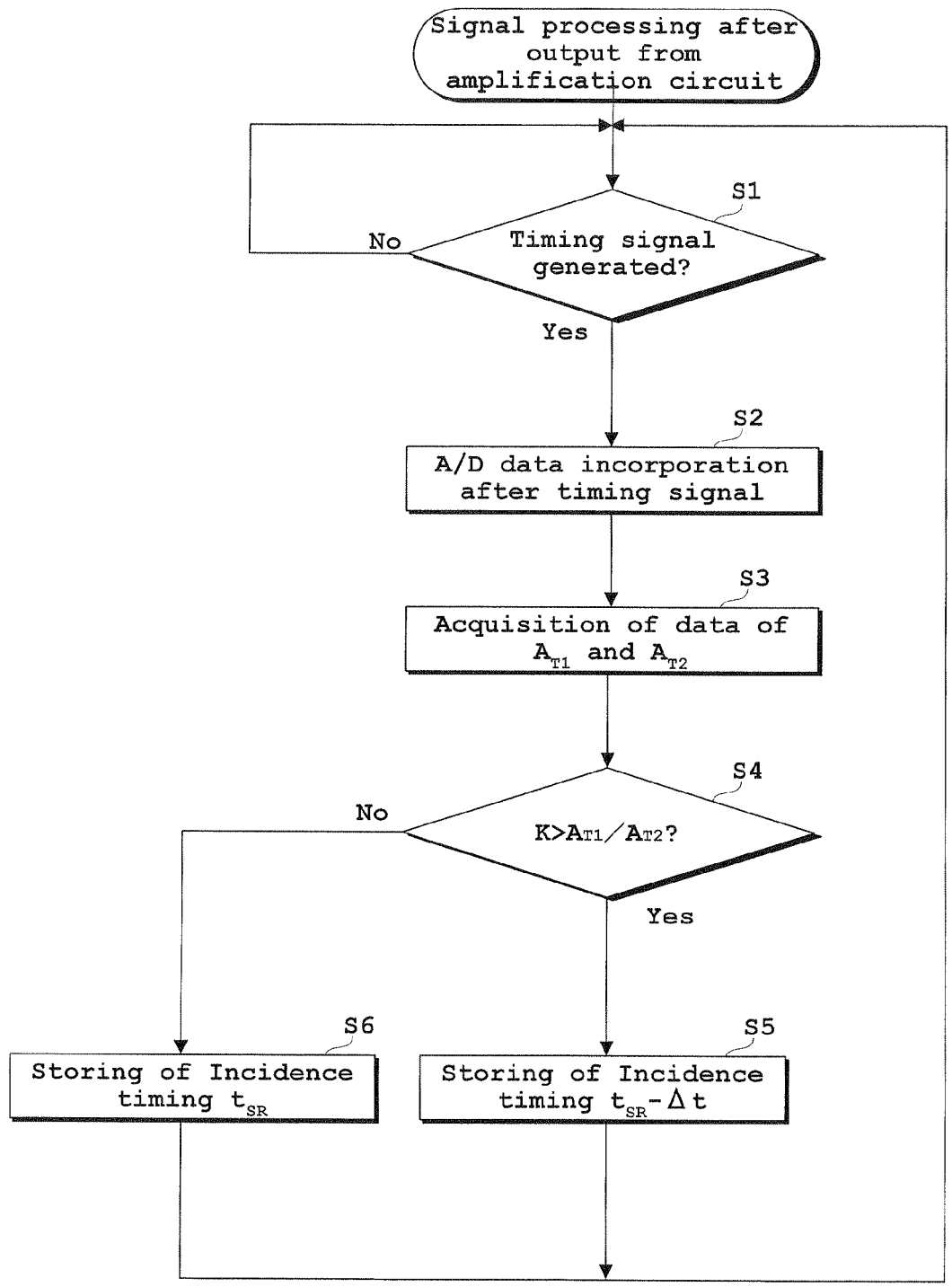
FIG. 10 is a flow chart illustrating a signal processing after being outputted from an amplification circuit.

Next, the operations will be described in order wherein a γ ray emitted from the subject M enters into the γ ray detector 1 and then is subjected to coincidence counting processing of the γ ray in the coincidence counting processing part 6, with reference to FIG. 1, FIG. 3, and FIG. 10. FIG. 10 illustrates a flow chart from an incidence timing occurrence until incidence timing compensation processing is carried out.

First, two γ rays emitted in a direction making approximately 180 degrees with each other from a region of interest of the subject enter into the opposing scintillator block 15 of the γ ray detectors 1, as illustrated in FIG. 1. The γ rays generate light in each of the scintillator 19a of the scintillator array 18a with a shorter decay time for the emitted light pulse and the scintillator 19b of the scintillator array 18b with longer decay time for emitted light pulse that constitute the scintillator block 15 as illustrated in FIG. 3. This light is guided to a light guide 16, and distributed to 4 PMT photoelectric conversion plates of the photo multiplier tube (PMT) 17 based on a position of incidence (X direction and Y direction of the scintillators 19a and 19b), reaching thereto. Furthermore, the lights are converted into electrical signals (analog signals) in the photo multiplier tube 17, and are outputted to the amplification circuits 2a and 2b. The voltage of the analog signals are amplified in the amplification circuits 2a and 2b and are outputted to the incidence timing calculation parts 4a and 4b and the A/D converters 3a and 3b. Furthermore, the analog signals inputted into the A/D converters 3a and 3b are A/D converted into digital signals, and are temporarily stored in the A/D converted signal storage part 23.

Here, there will be described, with reference to FIG. 10, a flow from calculation of incidence timings $t_{SF}$ and $t_{SR}$ of the incidence timing calculation parts 4a and 4b that have received analog signals from the amplification circuits 2a and 2b to a processing in the incidence timing compensation part 29 of this incidence timing $t_{SF}$ and $t_{SR}$, out of operations from incidence of a γ ray emitted from the subject M to the γ ray detector 1, up to the coincidence counting processing of the γ ray in the coincidence counting processing part 6. FIG. 10 is a flow chart illustrating the signal processing after the electrical signals outputted from the photo multiplier tube 17 have been outputted from the amplification circuits 2a and 2b.

(Step S1)

The ARC20 of the incidence timing calculation parts 4a and 4b calculate incidence timings $t_{SF}$ and $t_{SR}$ for analog signals outputted from the amplification circuits 2a and 2b based on inputs. Furthermore, the timing generator circuit 21 converts these incidence timings $t_{SF}$ and $t_{SR}$ into digital signals, and outputs to the incidence timing storage part 22. Here, when the incidence timings $t_{SF}$ and $t_{SR}$ are stored in the incidence timing storage part 22 (incidence timing $t_{SF}$ and $t_{SR}$ are generated), the flow proceeds to Step S2, and does not go to the next operation until the incidence timing $t_{SF}$ and $t_{SR}$ are generated (operation of the step S1 is repeated).

(Step S2)

The scintillator array identifying part 24 of the position arithmetic processing parts 5a and 5b reads the digital signals, after A/D conversion, that are temporarily stored in the A/D converted signal storage part 23 based on generation of the incidence timings $t_{SF}$ and $t_{SR}$, and the flow proceeds to Step S3.

(Step S3)

The scintillator array identifying part 24 of the position arithmetic processing parts 5a and 5b performs integration operation by adding sequentially the digital signals after A/D conversion. An intermediate added value $A_{T1}$ up to an intermediate $T_1$ (Fs×m: Fs represents sampling interval of the A/D conversion, and m represents the number of times of addition), and a total added value $A_{T2}$ up to the point of time of emission end $T_2$ (Fs×n: n is the total number of times of addition) are acquired, and subsequently the flow proceeds to Step S4.

(Step S4)

Furthermore, the scintillator array identifying part 24 of the position arithmetic processing parts 5a and 5b calculates an identified value that shows a value of (intermediate added value $A_{T1}$)/(total added value $A_{T2}$) from the intermediate added value $A_{T1}$ and the total added value $A_{T2}$, and it discriminates whether the identified value is a larger value or a smaller value as compared to an intermediate value K stored in the intermediate value data table 27 based on emitted light pulses emitted by each of the scintillators 19a and 19b of the two the scintillator arrays 18a and 18bs. Furthermore, it outputs signals that show these discriminated results to the incidence timing compensation part 29 of the position arithmetic processing parts 5a and 5b. Here, when the identified value is smaller than the intermediate value K, the flow proceeds to Step S5, and conversely, when the identified value is larger than the intermediate value K, the flow proceeds to Step S6.

(Step S5)

When the identified value is smaller than the intermediate value K, the decay time of the emitted light pulse of the scintillator array identified by the scintillator array identifying part 24 is determined to be longer. The incidence timing compensation part 29 of the position arithmetic processing parts 5a and 5b discriminates that a compensation for substituting the incidence timing $t_{SR}$ calculated by the incidence timing calculation parts 4a and 4b by $t_{SR}$−Δt (incidence timing compensated value) is to be performed. Accordingly, the incidence timing compensation part 29 reads out the incidence timing $t_{SR}$ stored in the incidence timing storage part 22, and performs compensation processing of substitution of this incidence timing $t_{SR}$ to $t_{SR}$−Δt. Subsequently, it outputs a signal that illustrates this $t_{SR}$−Δt to the post-compensation incidence timing storage part 30, and the signal is stored in the post-compensation incidence timing storage part 30.

(Step S6)

When the identified value is larger than the intermediate value K, it is determined that the decay time of emitted light pulse of the scintillator array identified by the scintillator array identifying part 24 is shorter. The incidence timing compensation part 29 of the position arithmetic processing parts 5a and 5b discriminates that a compensation of the incidence timing $t_{SR}$ calculated by the incidence timing calculation parts 4a and 4b is not to be performed. Accordingly, the incidence timing compensation part 29 reads out the incidence timing $t_{SR}$ stored in the incidence timing storage part 22, and outputs the signal that shows the incidence timing $t_{SR}$ to the post-compensation incidence timing storage part 30, as it is, without compensation processing for this incidence timing $t_{SR}$, to be stored in the post-compensation incidence timing storage part 30.

Next, the flow from the processing by the incidence timing compensation part 29 of this incidence timings $t_{SF}$ and $t_{SR}$ to the coincidence counting processing will be described with reference to FIG. 7, out of the operations from the incidence of the γ ray emitted from the subject M into the γ ray detector 1 to the coincidence counting processing of the γ ray in the coincidence counting processing part 6. The coincidence counting processing part 6 reads out the incidence timings $t_{SF}$ and $t_{SR}$ that have been stored in the post-compensation incidence timing storage part every 128 ns. The coincidence counting processing part 6 performs coincidence counting for the incidence timings $t_{SF}$, $t_{SR}$ from the 2γ ray detectors 1, in this case, 4 kinds of combinations. When the difference of time calculated by 4 kinds of the combination exists in the timing window Tw (for example, 6 ns), the count concerned is discriminated as a valid coincidence count, and when not, it is discriminated as an invalid count.

According to the above-described nuclear medicine diagnosis equipment, the incidence timing compensation part 29 discriminates whether a compensation of an incidence timing calculated by the incidence timing calculation parts 4a and 4b is to be performed or not corresponding to the scintillator array identified by the scintillator array identifying part 24, and then compensation for the incidence timing is performed based on the result of the discrimination. The difference of time of detections in the scintillator array 18a and the scintillator array 18b generated based on the difference in decay times for the emitted light pulse can be canceled by compensation, even in case of coincidence counting using a scintillator array 18a and a scintillator array 18b having different decay time for an emitted light pulse. Accordingly, a precise and accurate tomogram image providing a higher detection sensitivity and avoidance of degradation of a reconstructed image may be obtained even in use, as a γ ray detector, of a scintillator having different decay time for the emitted light pulse.

Incidentally, identification of whether an identified value calculated by the identified value calculating part 26 is a larger value or a smaller value may be performed based on sequential addition by the adding part 25 of the scintillator array identifying part 24. That is, the scintillator array identifying part 24 can identify which scintillator array in the scintillator has emitted the light pulse. Furthermore, since the integral operation conventionally performed with an integrator may be replaced to an addition operation of sequential addition by the adder, reduction of parts marks and cost reduction may be expected.

The present invention is not limited to the above-described embodiments, and modified implementation may be carried out as follows.

(1) Although a PET device has been adopted as an example and description has been given in the above-described embodiment, the present invention is not limited to the PET devices, and may be applied to any apparatuses, as long as it is a nuclear medicine equipment for performing nuclear medicine diagnosis by coincidence counting of a radiation generated from a subject that has been given a radiopharmaceutical.

(2) In the above-described embodiments, application is also possible to a combination device of a nuclear medicine diagnosis equipment and an X-ray CT scanner like PET-CT provided with a PET device and an X-ray CT scanner.

(3) The timing window storage part 32 may store timing windows Tw corresponding to a combination of each of a plurality of scintillator arrays. Accordingly, since different timing windows Tw are used with combination of each of a plurality of scintillator arrays, coincidence counting having high precision can be performed, and thereby influences of occurrence coincidence counting, dispersion coincidence counting, etc. are eliminated, leading to higher definition image with less noises.

(4) The timing window storage part 32 may store the timing window Tw corresponding to respective combinations of the plurality of scintillators. Accordingly, use of the different timing window Tw according to combination of each of the plurality of scintillators allows coincidence counting having high precision, also allows reduction of influence of random coincidence counting, scattered coincidence counting, etc., and also allows provision of higher definition image having less noise.

(5) In the above-described embodiment, the incidence timing compensation part 29 of the position arithmetic processing parts 5a and 5b performs an operation processing for substituting the incidence timing $t_{SR}$ calculated by the incidence timing calculation parts 4a and 4b by $t_{SR}-\Delta t$ (incidence timing compensated value), and the incidence timing $t_{SR}-\Delta t$ and an incidence timing $t_{SF}$ are to be stored in the post-compensation incidence timing storage part 30 without compensation processing of the incidence timing $t_{SF}$. However, the incidence timing compensation part 29 of the position arithmetic processing parts 5a and 5b may perform an operation processing for substituting the incidence timing $t_{SF}$ calculated by the incidence timing calculation parts 4a and 4b by $t_{SF}+\Delta t$, and the incidence timing $t_{SF}+\Delta t$ and the incidence timing $t_{SR}$ may be stored in the post-compensation incidence timing storage part 30 without compensation processing of the incidence timing $t_{SR}$.

(6) In the above-described embodiment, a difference of time of the rise times of the scintillator arrays 18a and 18b is stored in the compensation data table 31 as an incidence timing value for compensation. However, a difference of time of the different rise times between the scintillator 19s may be stored in the compensation data table 31 as an incidence timing compensated value. Accordingly, the difference of time of the different rise time between the scintillators 19 can be compensated, leading to further improvement in detection sensitivity.

(7) In the above-described embodiment, the difference of time of the different rise times between the scintillator arrays 18a and 18b is beforehand stored in the compensation data table 31 as an incidence timing compensated value. However, an incidence timing compensated value may be calculated in real time, for example, using a simple linear function that uses an identified value as a variable utilizing an identified value calculated by the identified value calculating device.

(8) In the above-described embodiment, the scintillator block 15 is constituted of a scintillator array 18a using $Lu_xY_{2-x}SiO_5$ (LYSO) in an incidence side of a γ ray (front step) as a scintillator 19a having a shorter decay time for an emitted light pulse and of a scintillator 19b using $Gd_2SiO_5$ (GSO) with Ce concentration of 0.5 mol) having a longer decay time of the emitted light pulse in a light guide 16 side (back step) as a scintillator 19b having a longer decay time for an emitted light pulse. Materials such as $Gd_2SiO_5$ (GSO) having Ce concentration of 0.5 mol, $Gd_2SiO_5$ (GSO) having Ce concentration of 1.5 mol, $Lu_2SiO_5$ (LSO), $Lu_xGd_{2-x}SiO_5$ (LGSO), $Lu_xY_{2-x}SiO_5$ (LYSO), $Bi_4Ge_3O_{12}$ (BGO), NaI, $BaF_2$, and CsF may be selected and may be used in various combination for the scintillator 19a of the scintillator array 18a and the scintillator 19b of the scintillator array 18b that constitute the scintillator block 15.

(9) In the above-described embodiment, although the scintillator block 15 has been described as a block having combined two-layers (pieces) of the scintillator array 18a and the scintillator array 18b, they may be combination of two or more layers (pieces) in stead of the combination of the two-layer (piece). Furthermore, although the number of the scintillators 19a and 19b of each scintillator has been described as a combination of 8 x 8, scintillators having a plurality of numbers of combination may also be used.

(10) In the above-described embodiment, although the photo multiplier tube 17 was exemplified as a photodetector, photodetectors other than the embodiment, for example, photo-diodes, avalanche photo-diodes, etc., may be used.

What is claimed is:

1. A nuclear medicine diagnosis equipment, comprising:
   a scintillator block having a plurality of two-dimensionally and closely arranged scintillators, the scintillator block having a plurality of optically combined scintillator arrays in a depth direction of an incident γ ray with different decay times for an emitted light pulse;
   a photodetector for converting an emitted light pulse emitted in the scintillator block into an electrical signal;
   an incidence timing calculating device for calculating an incident timing in the scintillator array for the electrical signal outputted from the photodetector;
   a scintillator array identifying device for identifying a scintillator array, in a plurality of arrays, that has received the electrical signal outputted from the photodetector; and
   an incidence timing compensation device for discriminating whether compensation for an incidence timing calculated by the incidence timing calculating device is to be done or not corresponding to a scintillator array identified by the scintillator array identification device, and for compensating the incidence timing based on a result of discrimination.

2. The nuclear medicine diagnosis equipment according to claim 1, comprising an A/D converter for converting an analog signal in a form of an electrical signal outputted from a photodetector into a digital signal, the scintillator array identifying device comprising:
   an adding device for sequentially adding digital signals converted by the A/D converter;
   an identified value calculating device for calculating an identified value giving a value obtained by division of an intermediate added value by a total added value by using an intermediate added value obtained, in the adding device, by addition of the digital signals from a point of time of emission start of the emitted light pulse that has been emitted in the scintillator block to a certain middle point of time in the course of a point of time of emission end, and a total added value obtained, in the adding device, by addition of a digital signal from a point of time of emission start to a point of time of emission end of the emitted light pulse that has been emitted in the scintillator block in the adding device; and a discriminating device for discriminating whether the identified value calculated by the identified value calculating device is a larger value or a smaller value as compared with an intermediate value between the identified values of each scintillator array calculated by the identified value calculating device.

3. The nuclear medicine diagnosis equipment according to claim 1, comprising:

a coincidence counting device for performing coincidence counting using an incidence timing compensated by the incidence timing compensation device and an incidence timing discriminated as not compensated by the incidence timing compensation device; and a timing window storing device for storing a timing window showing a predetermined range for performing coincidence counting by the coincidence counting device as a timing window corresponding to a combination of each of the plurality of scintillator arrays.

4. The nuclear medicine diagnosis equipment according to claim 1, comprising:

a coincidence counting device for performing coincidence counting using an incidence timing compensated by the incidence timing compensation device and an incidence timing discriminated as not compensated by the incidence timing compensation device; and a timing window storing device for storing a timing window showing a predetermined range for performing coincidence counting by the coincidence counting device as a timing window corresponding to a combination of each of the plurality of scintillators.

5. The nuclear medicine diagnosis equipment according to claim 1, comprising a light guide for optically coupling the scintillator block and the photodetector.

6. The nuclear medicine diagnosis equipment according to claim 1, wherein the a plurality of scintillator arrays is constituted by either one of scintillators of $Gd_2SiO_5$ (GSO) having Ce concentration of 0.5 mol, $Gd_2SiO_5$ (GSO) having Ce concentration of 1.5 mol, $Lu_2SiO_5$ (LSO), $Lu_xGd_{2-x}SiO_5$ (LGSO), $Lu_xY_{2-x}SiO_5$ (LYSO), $Bi_4Ge_3O_{12}$ (BGO), NaI, $BaF_2$, and CsF.

7. The nuclear medicine diagnosis equipment according to claim 1, wherein the photodetector is made of a photo multiplier tube.

8. The nuclear medicine diagnosis equipment according to claim 1, wherein the photodetector is made of a photo-diode.

9. The nuclear medicine diagnosis equipment according to claim 1, wherein the photodetector is made of an avalanche photodiode.

* * * * *